(12) United States Patent
    Huynh

(10) Patent No.: US 11,118,510 B2
(45) Date of Patent: Sep. 14, 2021

(54) CAM MECHANISM FOR VARIABLE-GEOMETRY CARET INLET

(71) Applicant: The Boeing Company, Chicago, IL (US)

(72) Inventor: Thuy Huynh, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 16/781,036

(22) Filed: Feb. 4, 2020

(65) Prior Publication Data
    US 2021/0239045 A1    Aug. 5, 2021

(51) Int. Cl.
    *F02C 7/042*    (2006.01)
    *B64D 33/02*    (2006.01)
    *B64D 41/00*    (2006.01)
    *B64C 30/00*    (2006.01)

(52) U.S. Cl.
    CPC ............ *F02C 7/042* (2013.01); *B64D 33/02* (2013.01); *B64D 41/00* (2013.01); *B64C 30/00* (2013.01); *F05D 2220/323* (2013.01)

(58) Field of Classification Search
    CPC ......... F02C 7/042; B64D 33/02; B64D 41/00; B64C 33/00; F05D 2220/323
    See application file for complete search history.

(56) References Cited

U.S. PATENT DOCUMENTS

| | | | | |
|---|---|---|---|---|
| 3,104,522 A | * | 9/1963 | Pennington | F02C 7/042 138/45 |
| 3,141,300 A | * | 7/1964 | Turcat | F02C 7/057 73/178 R |
| 3,417,767 A | * | 12/1968 | Young | F02C 7/042 137/15.2 |
| 3,430,640 A | * | 3/1969 | Lennard | F02C 7/042 137/15.1 |
| 5,026,004 A | * | 6/1991 | Dobie | B64D 33/02 244/53 B |
| 5,787,703 A | * | 8/1998 | Fougerousse | F02C 7/042 137/15.1 |
| 2002/0117581 A1 | * | 8/2002 | Sanders | F02C 7/042 244/53 B |

\* cited by examiner

*Primary Examiner* — Steven M Sutherland
(74) *Attorney, Agent, or Firm* — Felix L. Fischer

(57) ABSTRACT

An engine inlet for efficient operation at both design Mach number and off-design Mach numbers has a variable geometry caret inlet having an initial compression ramp and a principal compression ramp extending aft from and rotatably attached to the initial compression ramp at a forward hinge line. The principal compression ramp is rotatable from a low Mach position to a design Mach position. A diffuser ramp is engaged by the principal compression ramp at an interface. The diffuser ramp is rotatably mounted at an aft hinge line to a diffuser. The diffuser ramp is rotatable oppositely to the principal compression ramp to maintain contact at the interface. An actuation mechanism has a forward cam drive assembly configured to rotate the principal compression ramp about the forward hinge line. An aft cam drive assembly is configured to rotate the diffuser ramp about the aft hinge line. A motor assembly has at least one motor to drive the forward cam drive assembly and the aft cam drive assembly.

20 Claims, 16 Drawing Sheets

FIG. 7A

COUNTER ROTATE THE FORWARD DRIVE CAM ASSEMBLY AND ENGAGE AN INNER SURFACE OF THE FORWARD CAM WITH A FORWARD ROLLER ASSEMBLY MOUNTED TO THE FORWARD CAM RAMP PROXIMATE AN AFT EDGE WHILE THE FORWARD ROTATOR PLATE ROTATES THE FORWARD CAM IN A COUNTERCLOCKWISE DIRECTION TO WITHDRAW THE FORWARD ROLLER ASSEMBLY EXPANDING THE PRINCIPAL COMPRESSION RAMP OUTWARD TO ROTATE IN A SECOND DIRECTION ABOUT THE forward HINGE LINE TOWARD A LOW MACH POSITION — 716

COUNTER ROTATE THE AFT DRIVE CAM ASSEMBLY AND ENGAGE AN INNER SURFACE OF THE AFT CAM WITH AN AFT ROLLER ASSEMBLY MOUNTED TO THE AFT CAM RAMP PROXIMATE A FORWARD EDGE WHILE THE AFT ROTATOR PLATE IS ROTATED TO ROTATE THE AFT CAM IN A CLOCKWISE DIRECTION TO WITHDRAW THE AFT ROLLER ASSEMBLY EXPANDING THE DIFFUSER RAMP OUTWARD TO ROTATE IN A SECOND DIRECTION ABOUT THE AFT HINGE LINE TOWARD A LOW MACH POSITION — 718

MAINTAIN CONTACT BETWEEN AN AFT PORTION OF THE COMPRESSION RAMP AND A FORWARD PORTION OF THE DIFFUSER RAMP WITH AN INTERFACE BETWEEN THE COMPRESSION RAMP AND DIFFUSER RAMP — 720

FIG. 7B

CAM MECHANISM FOR VARIABLE-GEOMETRY CARET INLET

REFERENCE TO RELATED APPLICATIONS

This application is copending with application Ser. No. 16/438,774 filed on Jun. 12, 2019 entitled VARIABLE GEOMETRY TWO RAMP CARET INLET having a common assigned with the present application, the disclosure of which is incorporated herein by reference.

BACKGROUND INFORMATION

Field

Embodiments of the disclosure relate generally to supersonic inlets for aircraft jet engines and more particularly to a caret inlet having variable geometry with a cam mechanism for compression ramp and diffusion ramp displacement.

Background

Engine inlets for supersonic aircraft have complex aerodynamic requirements based on Mach number and other flight conditions. Fixed inlet geometries typically have highest efficiency at one specific Mach number and flight condition. Operation at other speeds or flight conditions results in degradation of the aerodynamic performance or efficiency of the inlet. To allow flight at varying Mach number, mechanical systems to adjust the capture area and ramp geometry of the inlet may be employed to increase efficiency. An existing solution to a variable ramps and variable capture inlet is the F-15 Eagle produced by The Boeing Company. This inlet system is highly efficient and is recognized as an optimized inlet design. However, later-generation fighters require additional aerodynamic tailoring capability. In such aircraft a caret-type inlet system is employed. Examples of aircraft employing such inlets are the F-18E/F Super Hornet produced by The Boeing Company and the F-22 Raptor produced by Lockheed Martin. These inlets are fixed geometry inlets and were designed for optimized operation at a particular flight Mach number. Carets are typically designed for a specific aircraft to achieve maximum efficiency at a single predetermined Mach number. The ramps are typically rectangular in shape and designed to be either fixed or variable to improve performance over a range of Mach numbers. Variable ramps require actuation systems which provide compact integration volumes.

SUMMARY

Exemplary implementations provide an engine inlet for efficient operation at both design Mach number and off-design Mach numbers with a variable geometry caret inlet having an initial compression ramp and a principal compression ramp extending aft from and rotatably attached to the initial compression ramp at a forward hinge line. The principal compression ramp is rotatable from a low Mach position to a design Mach position. A diffuser ramp is engaged by the principal compression ramp at an interface. The diffuser ramp is rotatably mounted at an aft hinge line to a diffuser. The diffuser ramp is rotatable oppositely to the principal compression ramp to maintain contact at the interface. An actuation mechanism has a forward cam drive assembly configured to rotate the principal compression ramp about the forward hinge line. An aft cam drive assembly is configured to rotate the diffuser ramp about the aft hinge line. A motor assembly has at least one motor to drive the forward cam drive assembly and the aft cam drive assembly.

The exemplary implementations provide a method of operation of a variable geometry caret inlet. A forward drive cam assembly is rotated urging a compression ramp inward to rotate in a first direction about a forward hinge line toward a high Mach position. An aft drive cam assembly is oppositely rotated urging a diffuser ramp inward to rotate in a first direction about an aft hinge line. Contact is maintained between an aft portion of the compression ramp and a forward portion of the diffuser ramp with an interface between the compression ramp and diffuser ramp.

BRIEF DESCRIPTION OF THE DRAWINGS

The features, functions, and advantages that have been discussed can be achieved independently in various implementations of the present disclosure or may be combined in yet other implementations, further details of which can be seen with reference to the following description and drawings.

DETAILED DESCRIPTION

The system and methods described herein provide embodiments for a caret inlet with variable geometry to maximize pressure recovery across the Mach envelope range by varying the compression ramp and diffusor ramp setting to provide a maximum efficiency over a range of flight Mach number; a range from a low Mach number for takeoff and landing achieved with 0 degree compression position in the example implementation to a high design Mach position achieved with a 10 degree compression position in the example implementation. A cam and ramp engagement system actuates each of the compression ramp and diffusor ramp through the range of positions.

Figure 1:
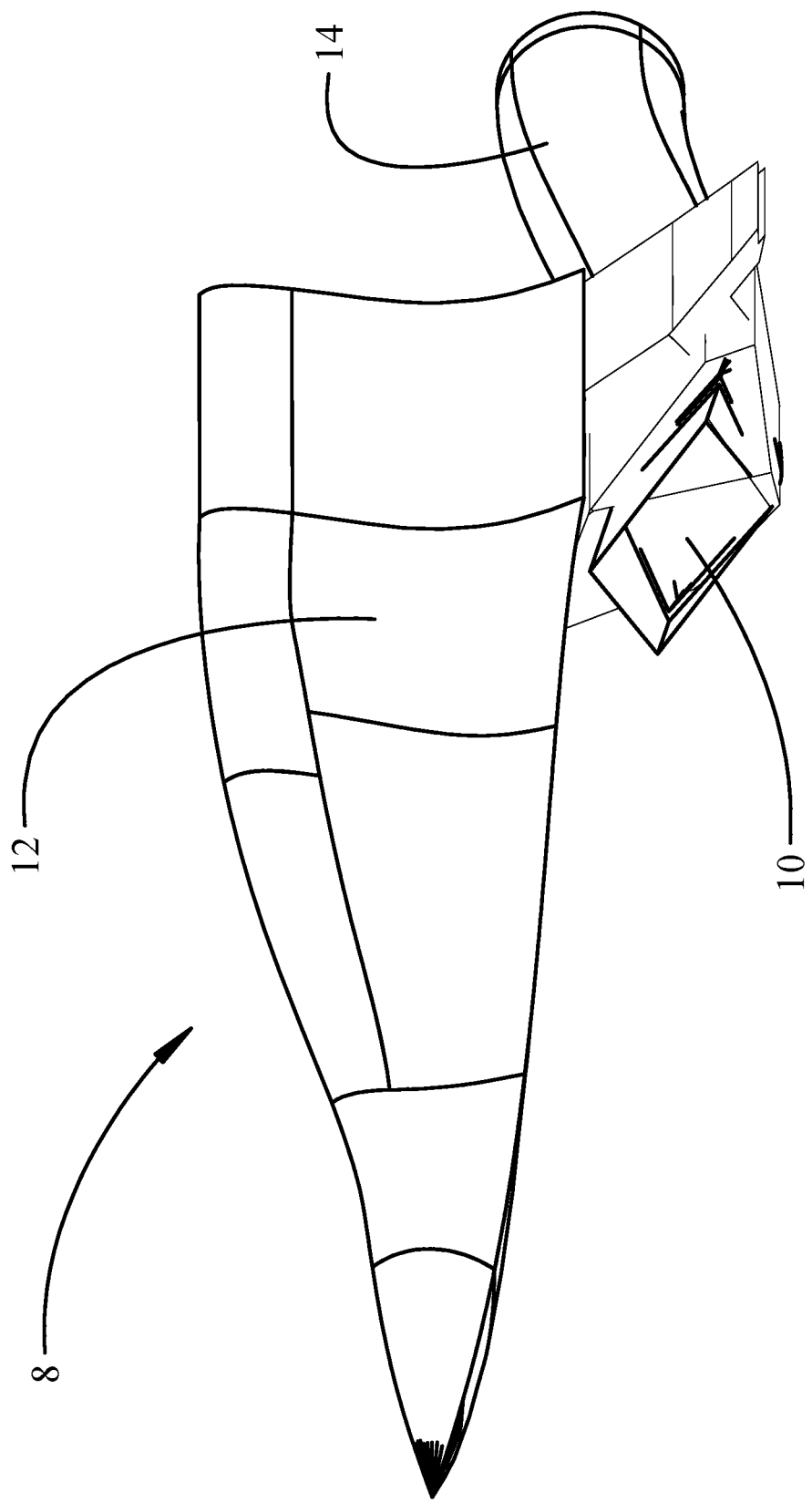
FIG. 1 is a pictorial representation of portions of an aircraft incorporating implementations of the variable geometry caret inlet as disclosed herein.
Figure 2:
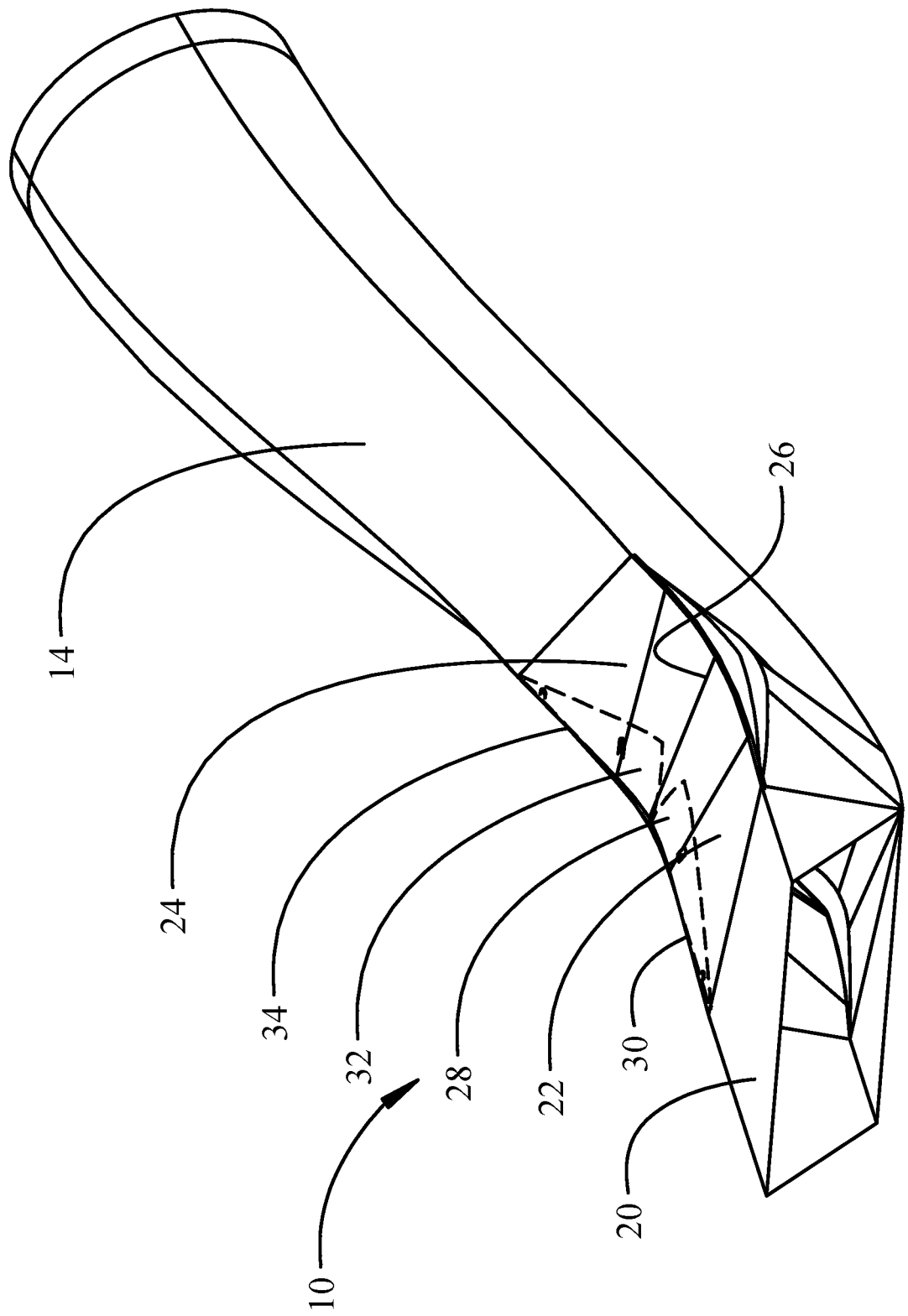
FIG. 2 is a pictorial representation of the variable geometry caret inlet.

Referring to the drawings, FIG. 1 shows representative portions of an exemplary aircraft 8 employing an implementation of a two-ramp caret inlet as disclosed herein. A caret inlet 10 is mounted adjacent a fuselage 12. A diffuser 14 extends from the caret inlet 10 to a jet engine (not shown). The elements of the two-ramp caret inlet 10, as seen in FIG. 2, include an inlet cowl 18 and an initial compression ramp 20. For the example implementation shown, the initial compression ramp 20 is fixed. A principal compression ramp 22 extends aft from the initial compression ramp 20 and engages a diffuser ramp 24 at an interface 26. In the example implementation, a compression ramp filler 28 engages the principal compression ramp 22 at a compression ramp inboard edge 30 with a first scrubbing surface and a diffuser ramp filler 32 engages the diffuser ramp 24 at a diffuser ramp inboard edge 34 with a second scrubbing surface as described in copending application Ser. No. 16/438,774.

Figure 3:
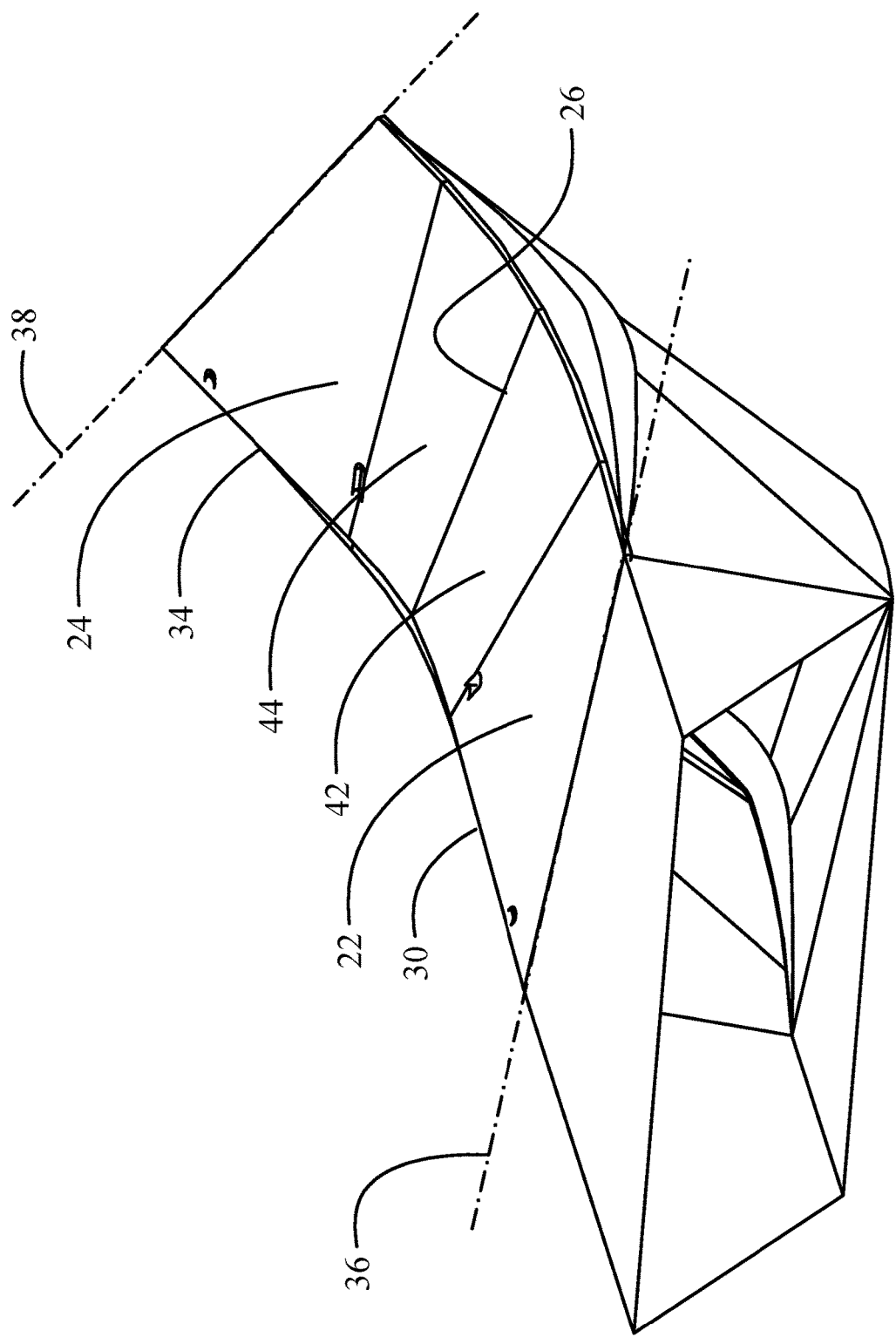
FIG. 3 is a pictorial representation of the variable geometry caret inlet with details of the principal compression ramp and diffuser ramp.

As seen in FIG. 3, the principal compression ramp 22 is mounted to the initial compression ramp 20 for rotation about a forward hinge line 36. The diffuser ramp 24 is mounted to the diffuser 14 for rotation about an aft hinge line 38. Rotation of the principal compression ramp and the diffuser ramp about their respective hinge lines provides variable geometry for the caret inlet to tailor compression and expansion of incoming airflow over a range of Mach numbers. As will be described in greater detail subsequently, the example implementation of the caret inlet provides rotation of the principal compression ramp from a compression position for low Mach, 0 degrees for the example implementation shown in the drawings, to a compression position optimized for a design point high Mach, 10 degrees for the example implementation shown in the drawings, with commensurate opposite rotation of the diffuser ramp to maintain contact at the interface 26. The caret inlet approximates a two-dimensional (2D) inlet with a trapezoidal inlet aperture 40 and substantially flat sides. However, aerodynamic considerations require a curved interface between the principal compression ramp 22 and the diffuser ramp 24. As seen in FIG. 3, the principal compression ramp 22 has a trailing portion 42 providing converging curvature approaching interface 26 and the diffuser ramp 24 has a leading portion 44 providing diverging curvature departing aft from the interface 26.

Operation of the variable geometry principal compression ramp 22 and diffuser ramp 24 is accomplished with an actuation mechanism 50 as shown in FIGS. 4A-4E and FIGS. 5A-5B. Actuation mechanism 50 employs a forward cam drive assembly 52 configured to actuate the principal compression ramp 22 and an aft cam drive assembly 54 configured to actuate the diffuser ramp 24. A motor assembly 56 incorporating planetary gearing or similar transmission elements drives a forward drive shaft 58 and an aft drive shaft 60 with opposite rotational directions.

The forward drive shaft 58 interfaces to the forward cam drive assembly 52 through a forward gear box 62a employing bevel gears or a similar arrangement to drive a forward cam shaft 64a. A forward rotator plate 66a extends from forward cam shaft 64a to arcuate forward cam 68a having an outer surface 70a and an inner surface 72a. The forward rotator plate 66a engages the forward cam 68a with a first radius 73a relative to a rotation axis 65a (best seen in FIG. 5A) of the forward cam shaft 64a corresponding to the low Mach position of the principal compression ramp 22 and a second radius 73b at a rotation angle 75 corresponding to the high Mach position (best seen in FIG. 5B). A forward cam ramp 74a, mounted to or integrally extending from the principal compression ramp 22, receives the outer surface 70a of the forward cam 68a in sliding engagement whereby rotation of the forward cam in a clockwise direction through the rotation angle urges the forward cam ramp 74a and principal compression ramp 22 inward to rotate about the forward hinge line 36 toward the high Mach position. The forward cam 68a is engaged between the forward cam ramp 74a and a forward roller assembly 76a. The forward roller assembly is mounted to the forward cam ramp 74a proximate an aft edge 78a and engages the inner surface 72a of the forward cam 68a. Counterclockwise rotation of the forward cam 68a urges the forward roller assembly 76a outward drawing the principal compression ramp 22 outward rotating about the forward hinge line toward the low Mach position.

Similarly, the aft drive shaft 58 interfaces to the aft cam drive through an aft gear box 62b employing bevel gears or a similar arrangement to drive an aft cam shaft 64b. An aft rotator plate 66b extends from aft cam shaft 64b to an arcuate aft cam 68b having an outer surface 70b and an inner surface 72b. The aft rotator plate 66b engages the aft cam 68b with a first radius 73c relative to a rotation axis 65b of the aft cam shaft 64b corresponding to the low Mach position of the diffuser ramp 24 and a second radius 73d at the rotation angle 75 corresponding to the high Mach position. An aft cam ramp 74b, mounted to or integrally extending from the diffuser ramp 24, receives the outer surface 70b of the aft cam 68b in sliding engagement whereby rotation of the aft cam in a counterclockwise direction through the rotation angle urges the aft cam ramp 74b and diffuser ramp 24 to rotate inward about the aft hinge line 36 toward the high Mach position. The aft cam 68b is engaged between the aft cam ramp 74 and an aft roller assembly 76b. The aft roller assembly is mounted to the aft cam ramp 74b proximate an forward edge 78b and engages the inner surface 72b of the aft cam 68b. Clockwise rotation of the aft cam 68 urges the forward roller assembly 76 to rotate outward about the aft hinge line drawing the principal compression ramp 22 toward the low Mach position.

Figure 5A:
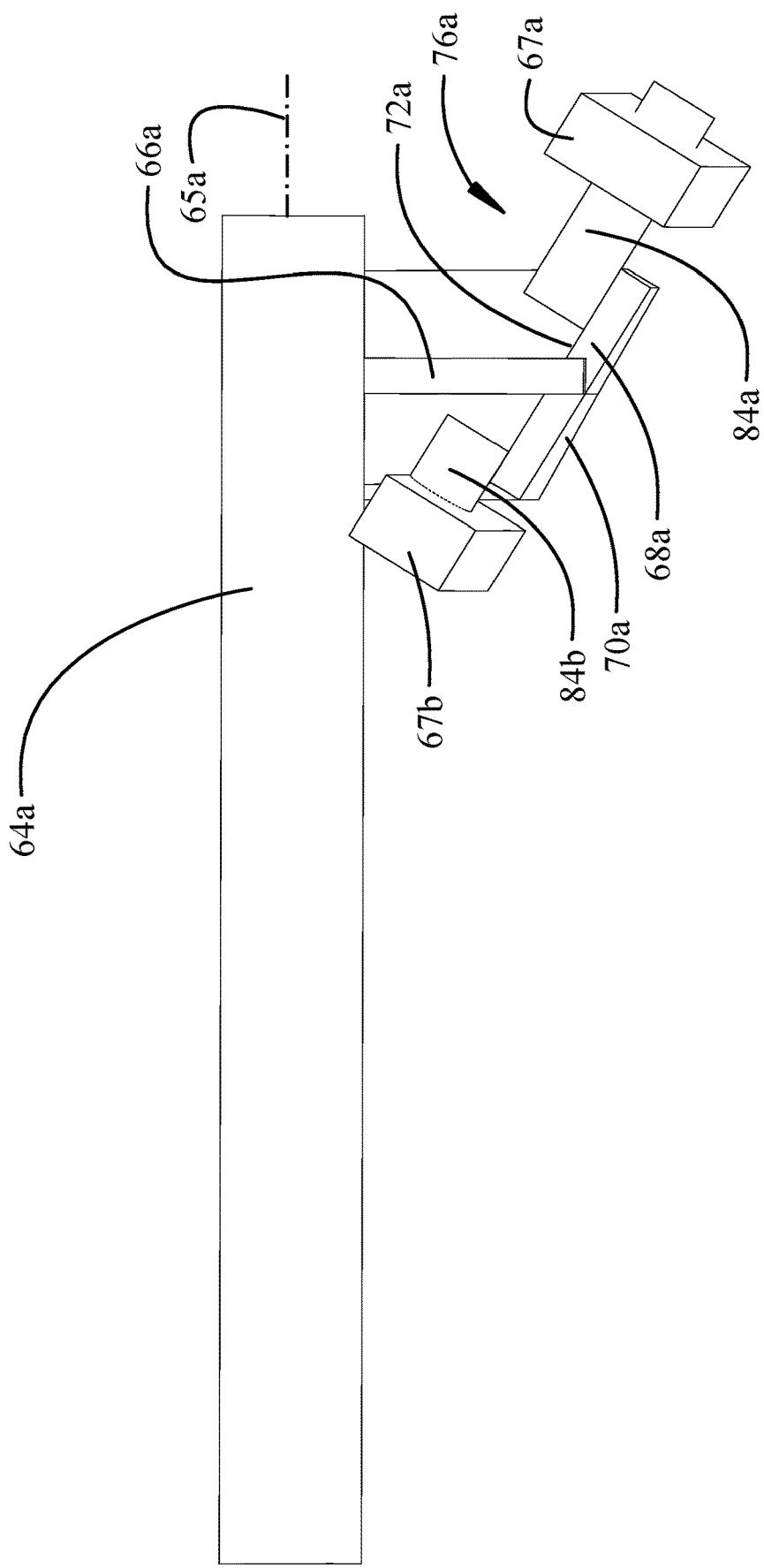
FIG. 5A is a front view of an example implementation of the cam ramps and roller assemblies.
Figure 5B:
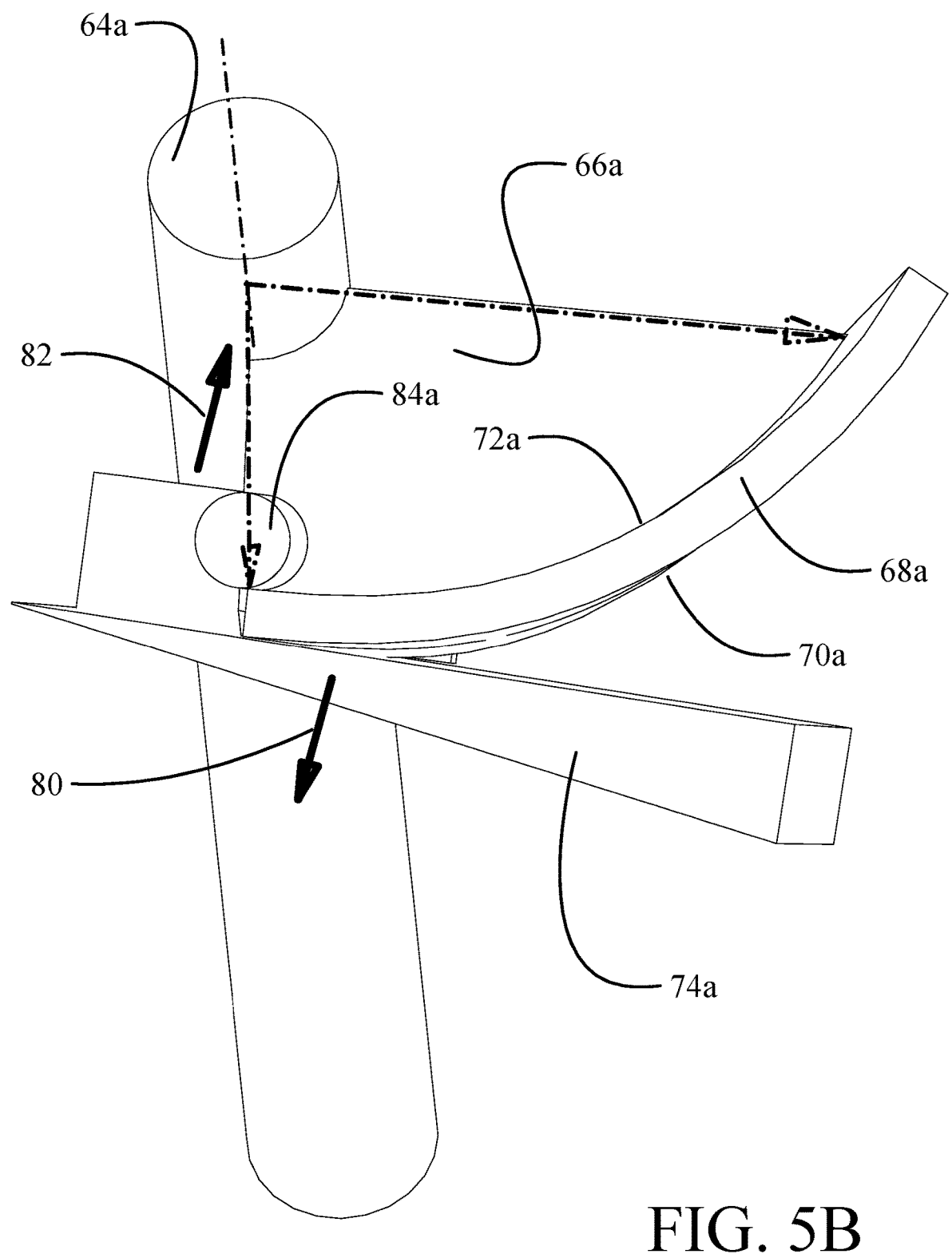
FIG. 5B is a side view of the example implementation of the cam ramp and roller assemblies.
Figure 5C:
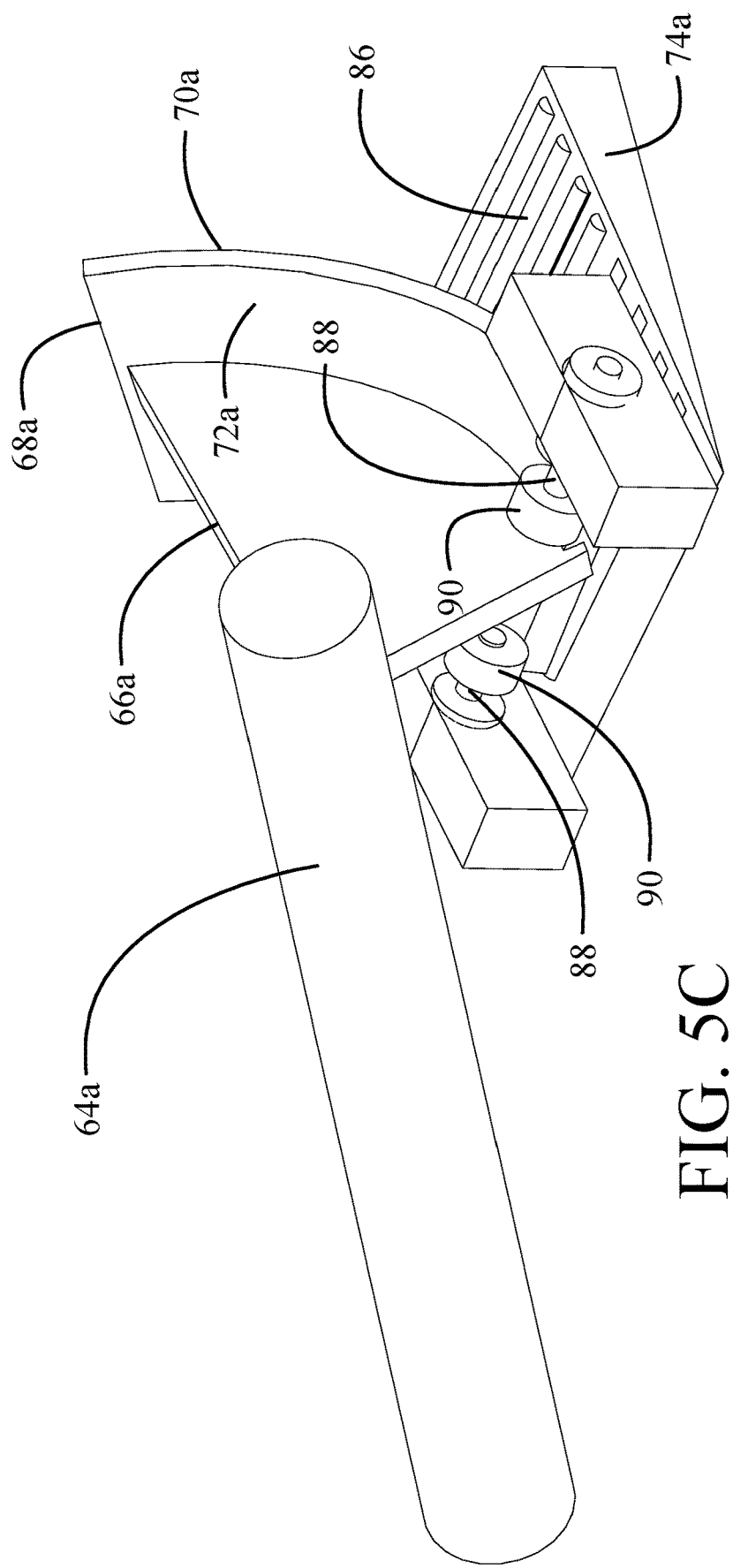
FIG. 5C is a section view of a second example implementation of the cam ramp and roller assemblies.
Figure 5D:
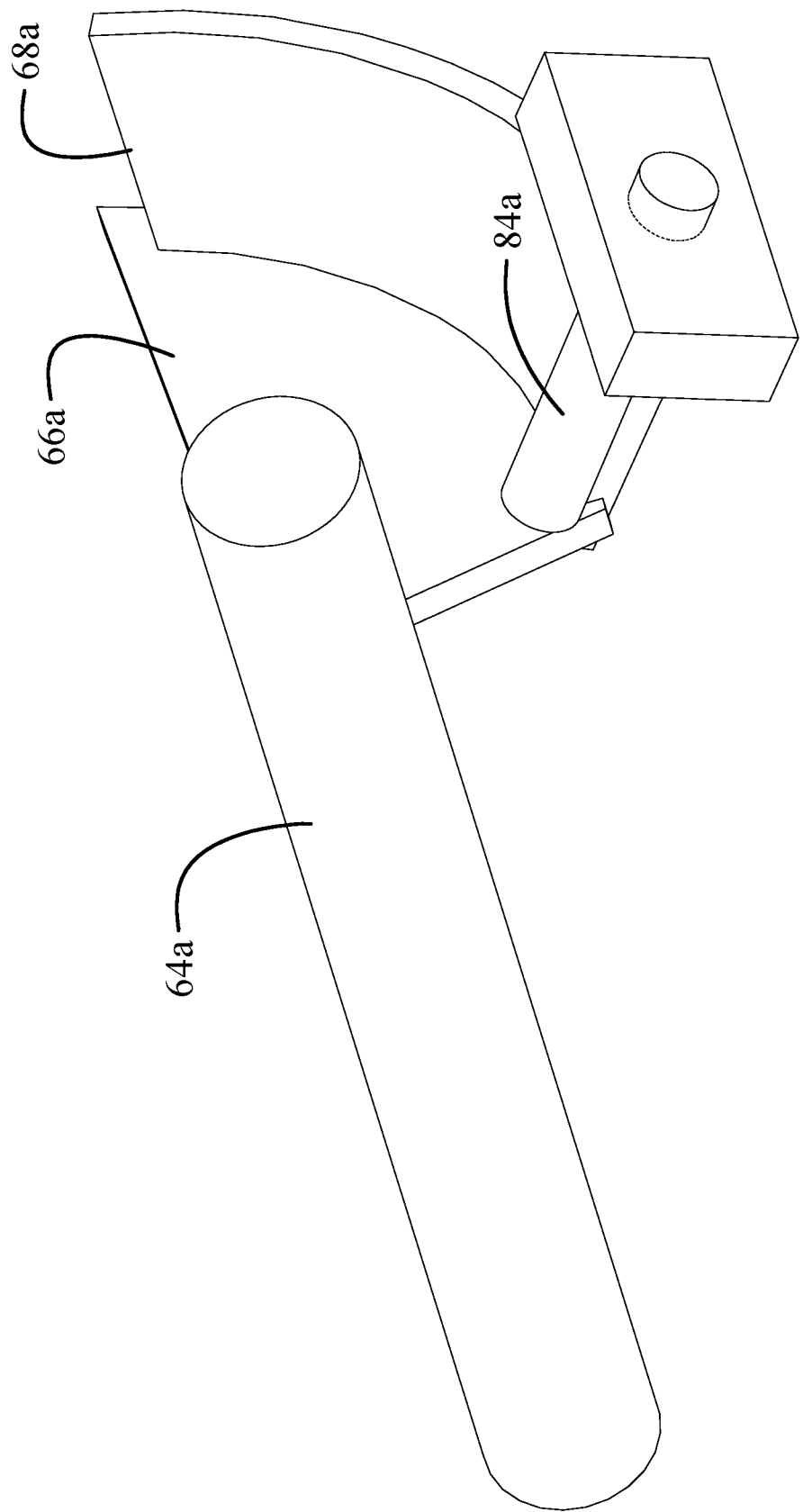
FIG. 5D is a detailed view of a third example implementation of the cam ramp and roller assemblies.

An example representative of both the forward and aft cam drive assemblies 52, 54 is seen in FIGS. 5A and 5B (shown for forward cam drive assembly 52 with associated element numbering, the aft cam drive assembly operating with opposite rotation). As shown, the rotator plates 66a, 66b extend from the cam shafts 64a, 64b and terminate in the cams 68am 68b. Each cam 68a, 68b has an outer surface 70a, 70b and an inner surface 72a, 72b. The outer surface engages the cam ramp 74a, 74b (seen in FIG. 5B) with both the outer surface and cam ramp providing lubricious contact for sliding engagement. Upon rotation to depress the principal compression ramp and diffuser ramp (clockwise for the forward cam drive assembly 52 depressing the compression ramp), the cams urge the cam ramps inward as indicated by arrow 80. Upon rotation to expand the principal compression ramp and diffuser ramp (counterclockwise for the forward cam drive assembly 52), the inner surfaces 72a, 72b engage the roller assemblies 76a, 76b and the cams urge the roller assemblies outward as indicated by arrow 82. For this example, the roller assemblies 76a, 76b incorporate cantilever rolling pins 84a and 84b on opposing sides of the rotation plates 66a, 66b to engage the inner surfaces 72a, 72b in rolling contact. For the example implementation, the cantilever rolling pins are supported by support blocks 67a, 67b mounted to the cam ramps 74a, 74b In alternative implementations seen in FIG. 5C, the forward and aft cam ramps 74a, 74b each employ an array of roller bearings 86 on the surface of the cam ramp for rolling engagement with the outer surface 70a. 70b of the forward and aft cams 68a, 68b. The roller assemblies employ stub axles 88 rotationally supporting wheels or roller bearings 90 engaging the inner surfaces of the cams for low friction engagement. While shown for the example implementations in FIGS. 5A, 5B and 5C with the rotator plates 66a, 66b engaging the cam 68a. 68b on a centerline of the cam, the rolling pins 84a, 84b may be employed on only one side of the rotator plate with the rotator plate asymmetrically attach to the cam proximate one edge as shown in FIG. 5D.

Figure 4A:
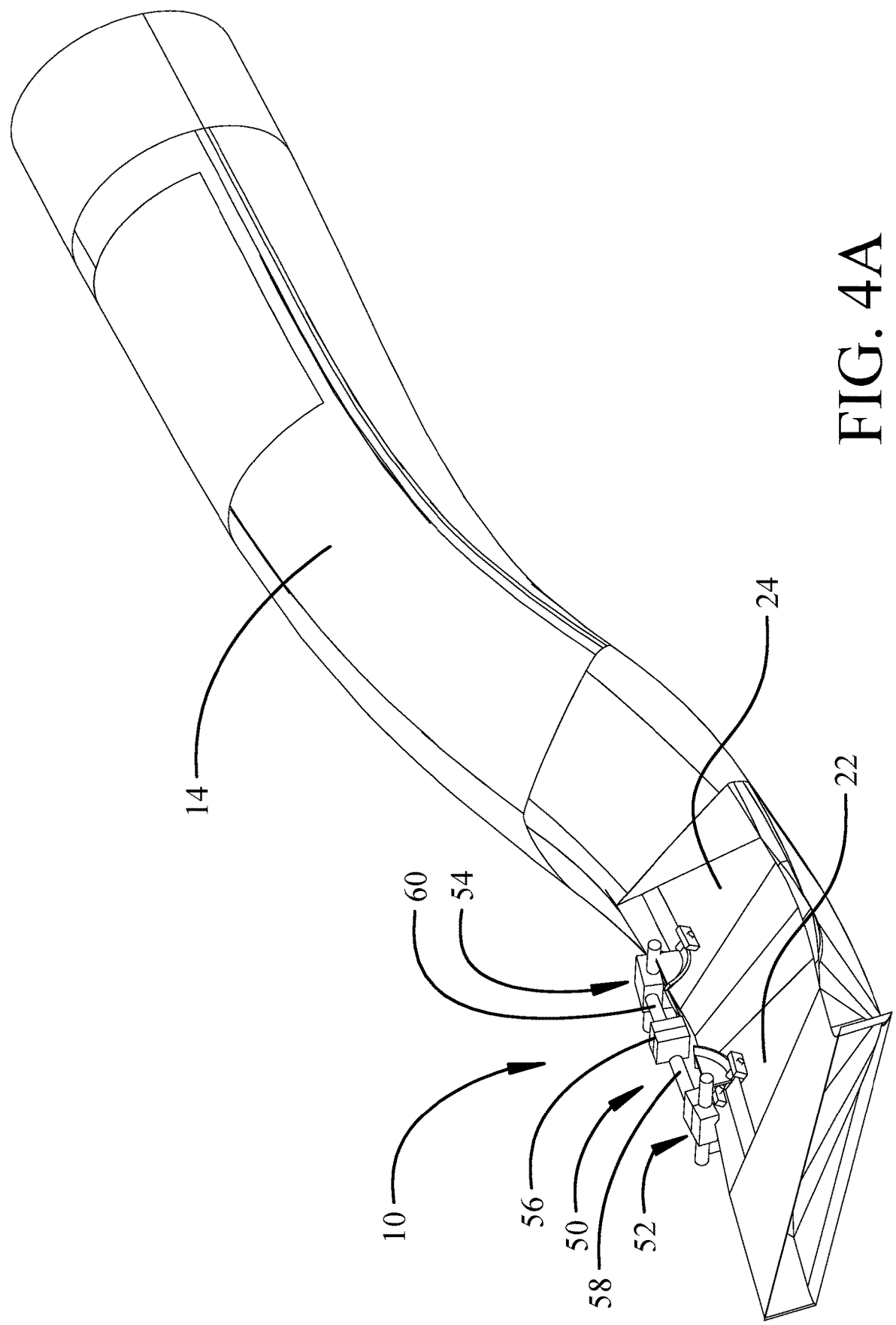
FIG. 4A is a pictorial representation of the variable geometry caret inlet with details of the ramp actuation mechanism in the 0 degree low Mach position.
Figure 4B:
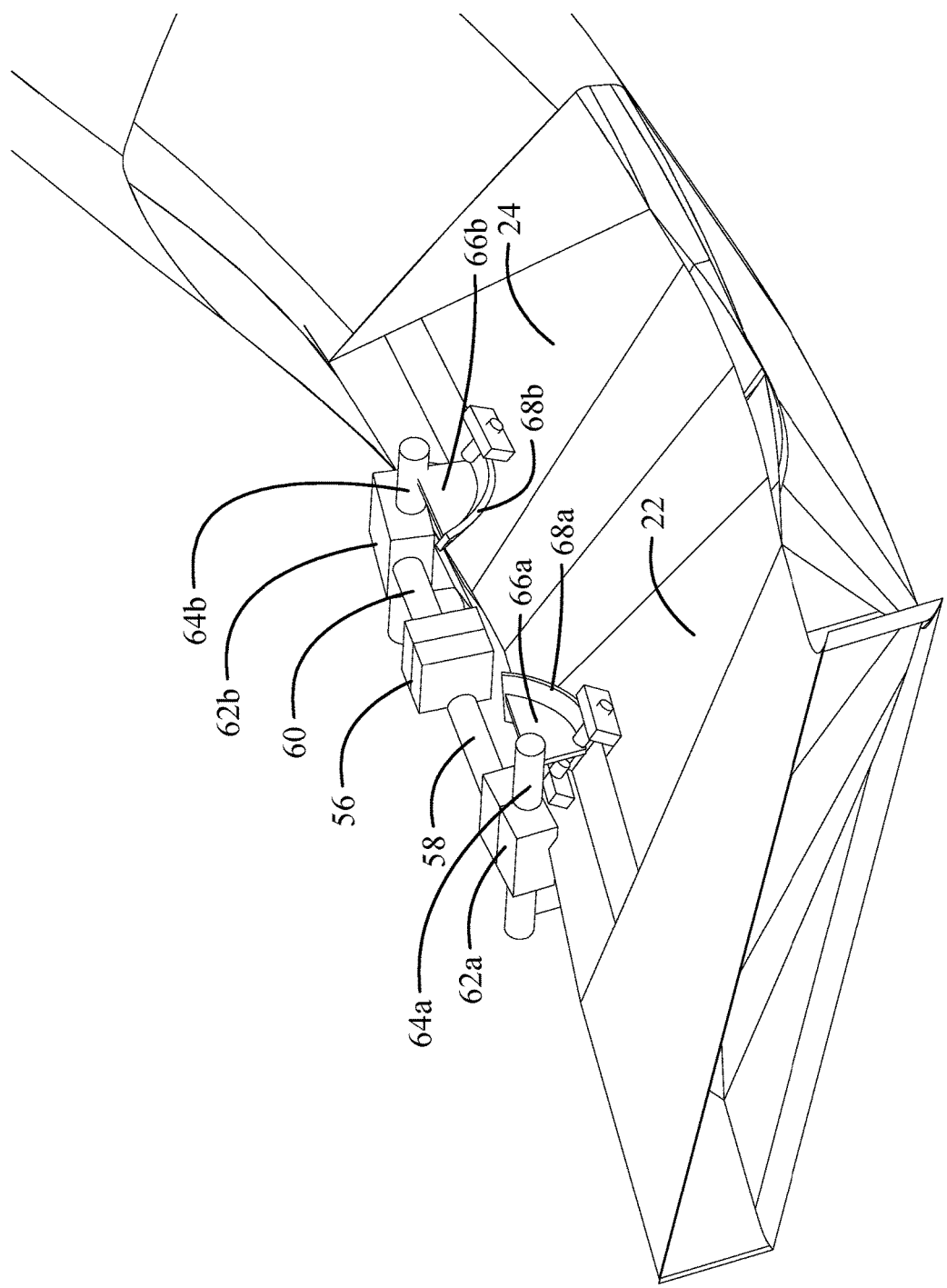
FIG. 4B is a close up of the variable geometry caret inlet with details of the ramp actuation mechanism in the 0 degree low Mach position.
Figure 4C:
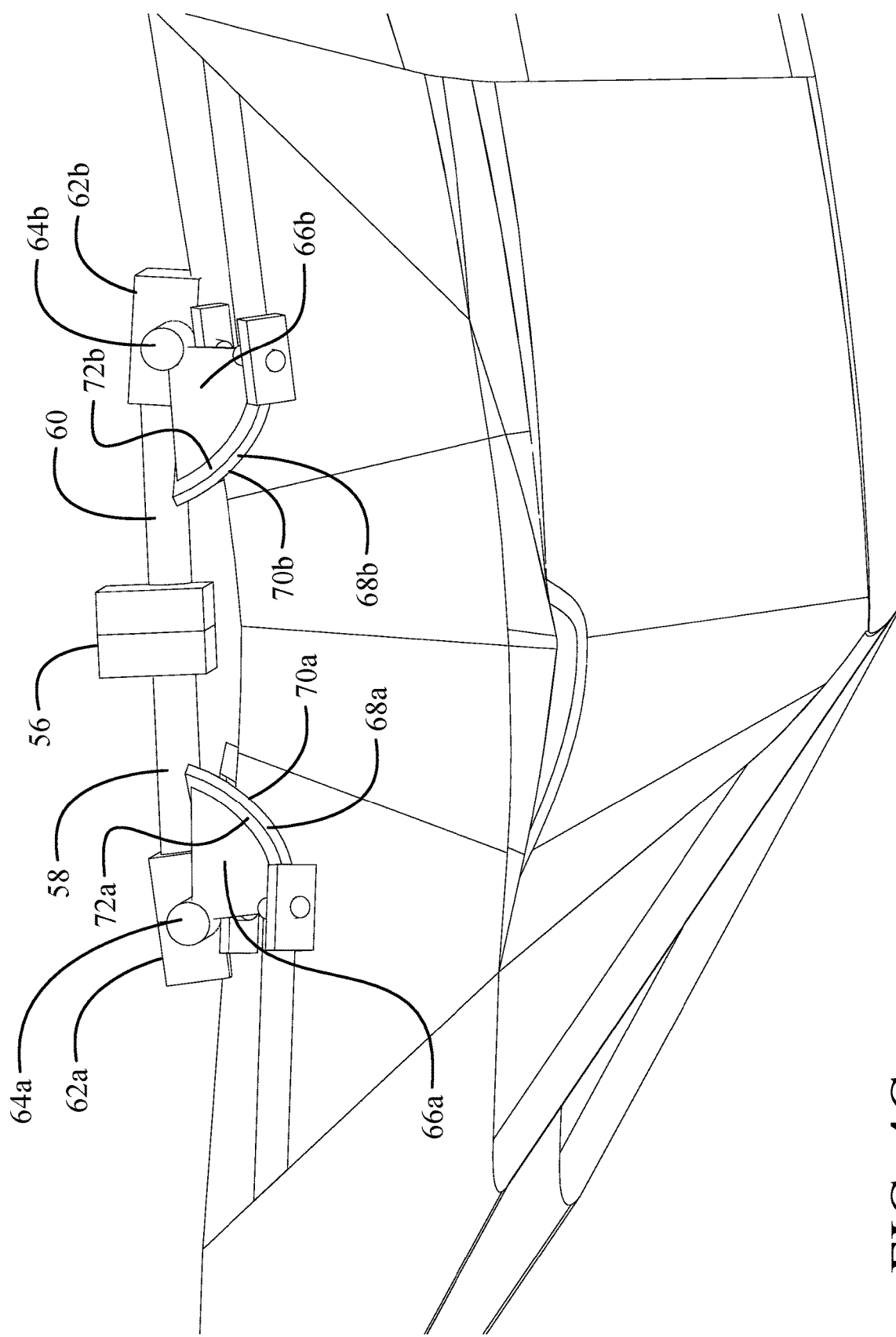
FIG. 4C is a side view of the variable geometry caret inlet with details of the ramp actuation mechanism in the 0 degree low Mach position.
Figure 4D:
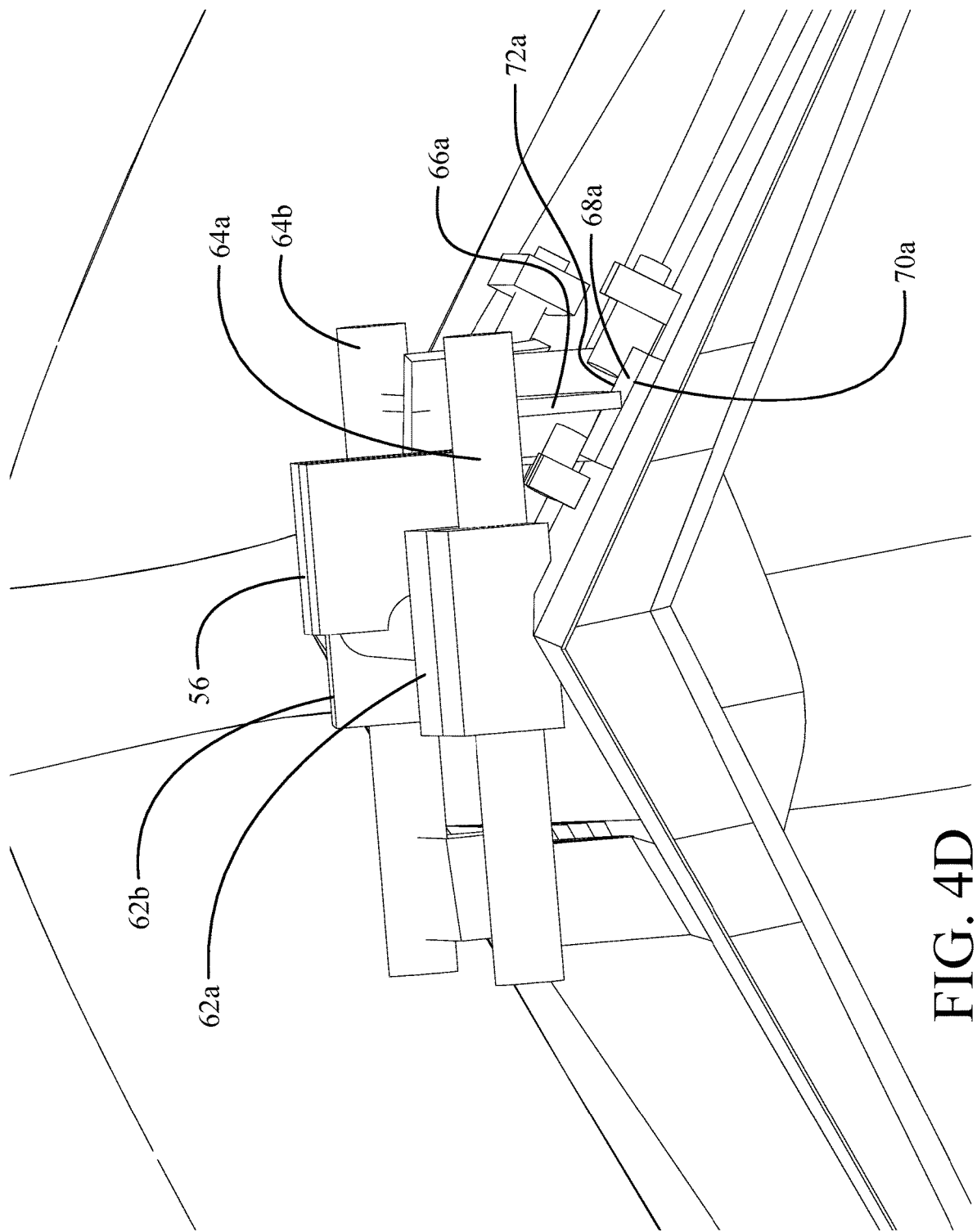
FIG. 4D is a front view of the variable geometry caret inlet with details of the ramp actuation mechanism in the 0 degree low Mach position.
Figure 6A:
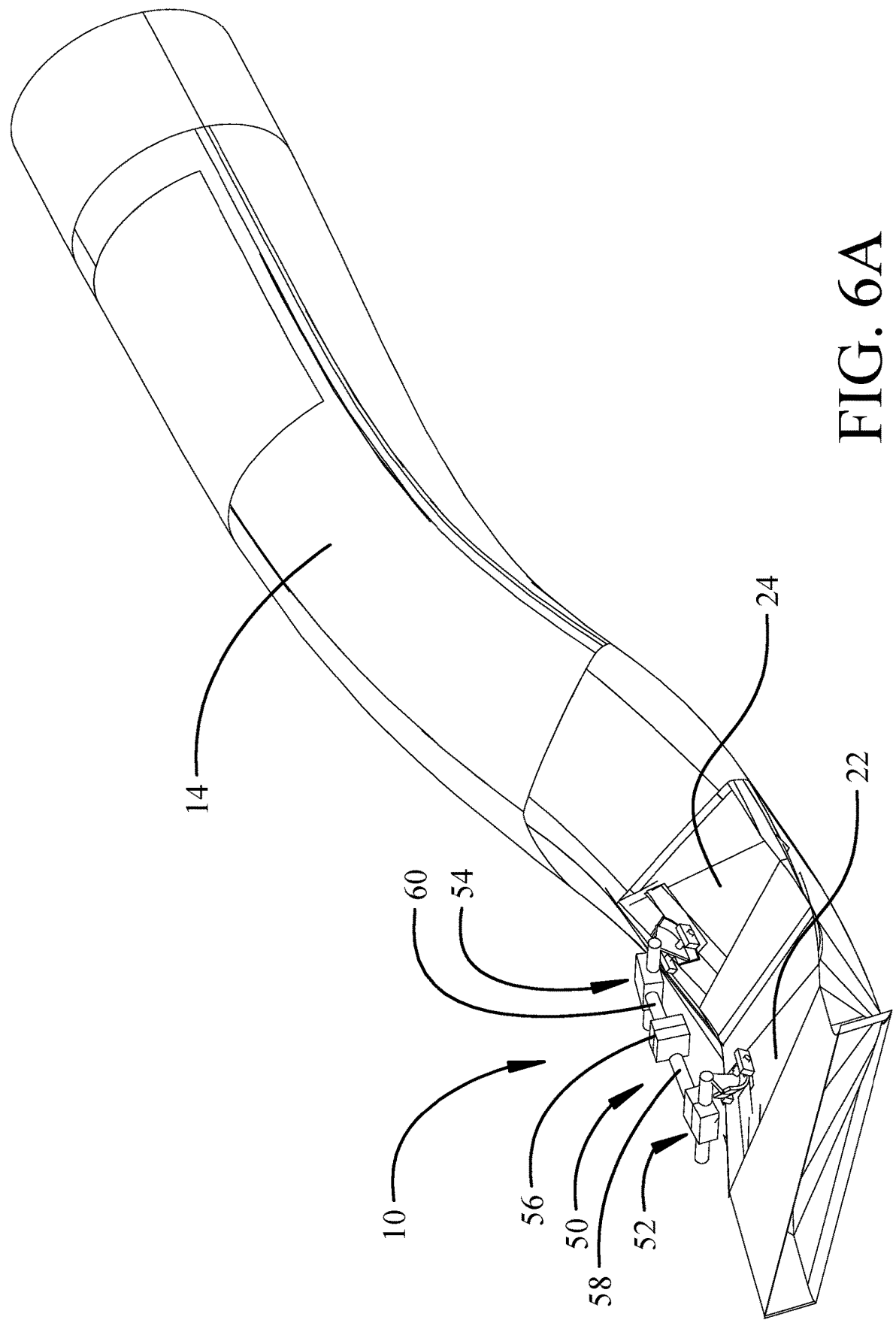
FIG. 6A is a pictorial representation of the variable geometry caret inlet with details of the ramp actuation mechanism in the 10 degree high design Mach position.
Figure 6B:
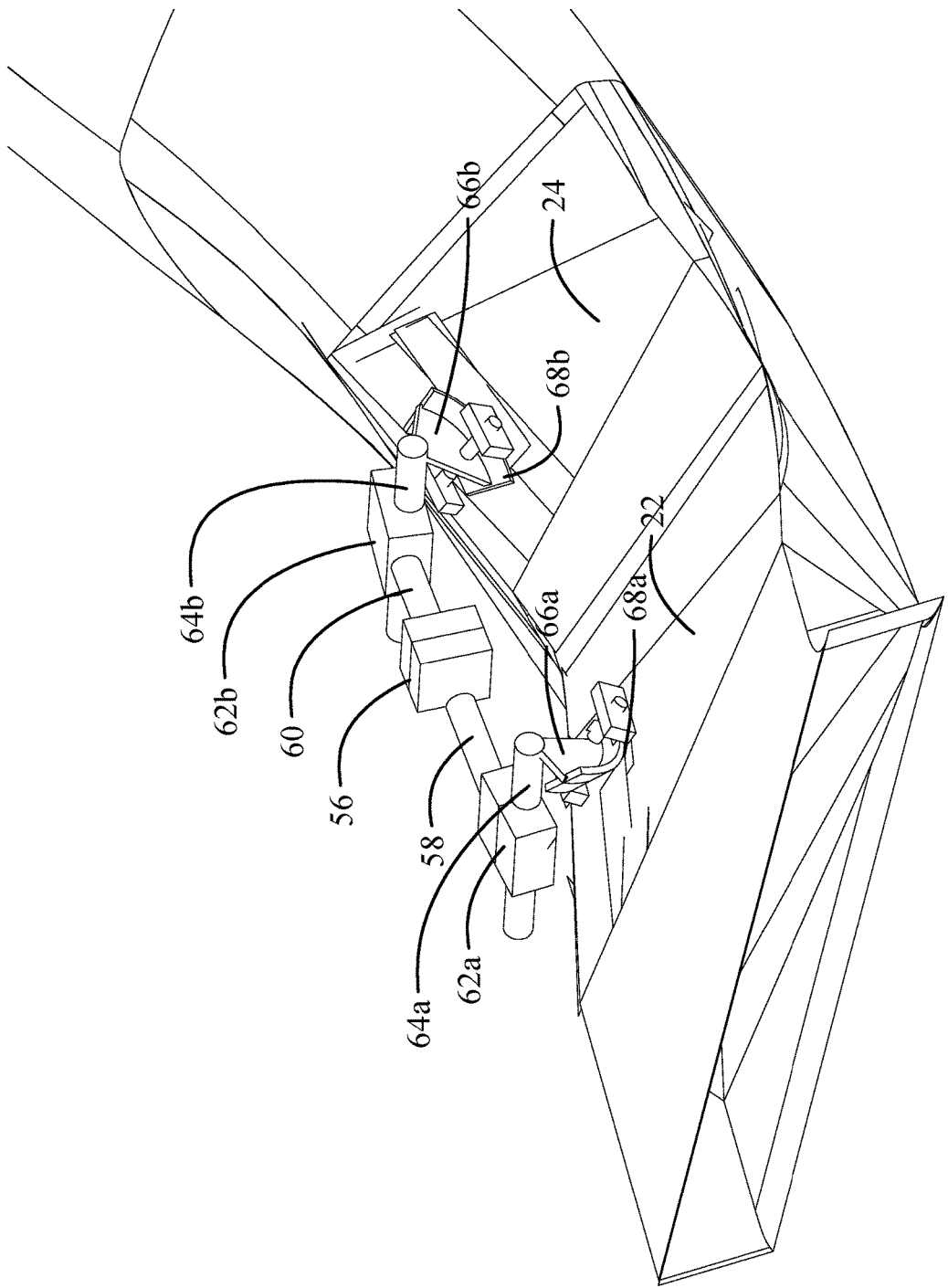
FIG. 6B is a top view of the variable geometry caret inlet with details of the ramp actuation mechanism in the 10 degree high design Mach position.
Figure 6C:
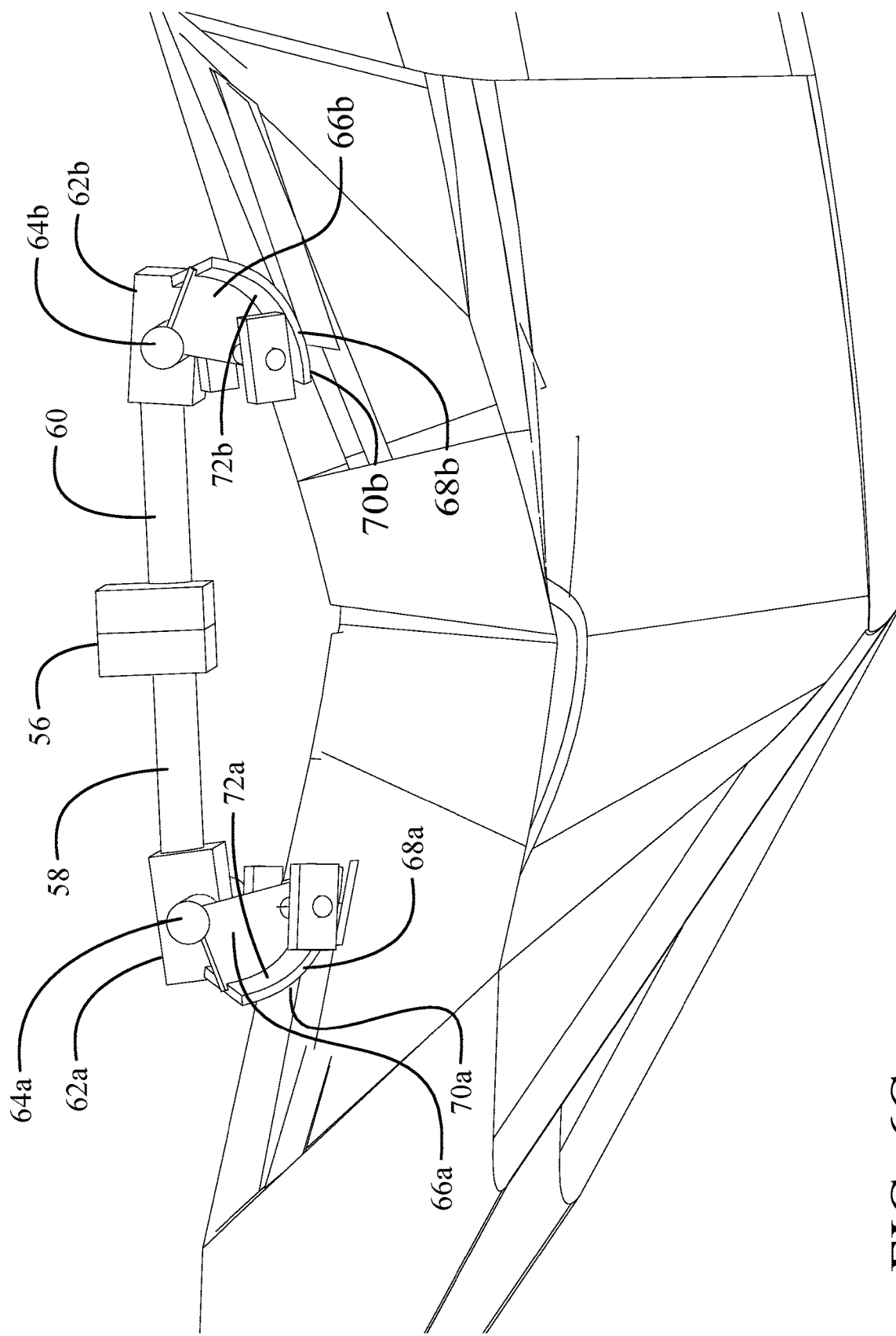
FIG. 6C is a side view of the variable geometry caret inlet with details of the ramp actuation mechanism in the 10 degree high design Mach position; and, FIGS. 7A and 7B are a flow chart for a method for operation of a variable geometry caret inlet employing the implementations disclosed.

As seen in FIGS. 6A-6C with the ramps in the 10 degree high design point Mach position, clockwise rotation of the forward cam shaft with resulting rotation of the forward cam depresses the forward cam ramp urging the principal compression ramp 22 to rotate downward along forward hinge line 36 from the low Mach position seen in FIG. 4A-4C to the high Mach position. Simultaneous counterclockwise rotation of the aft cam shaft with resulting rotation of the aft cam depresses the aft cam ramp downward urging the diffuser ramp 24 to rotate downward along aft hinge line 38.

Figure 7A:
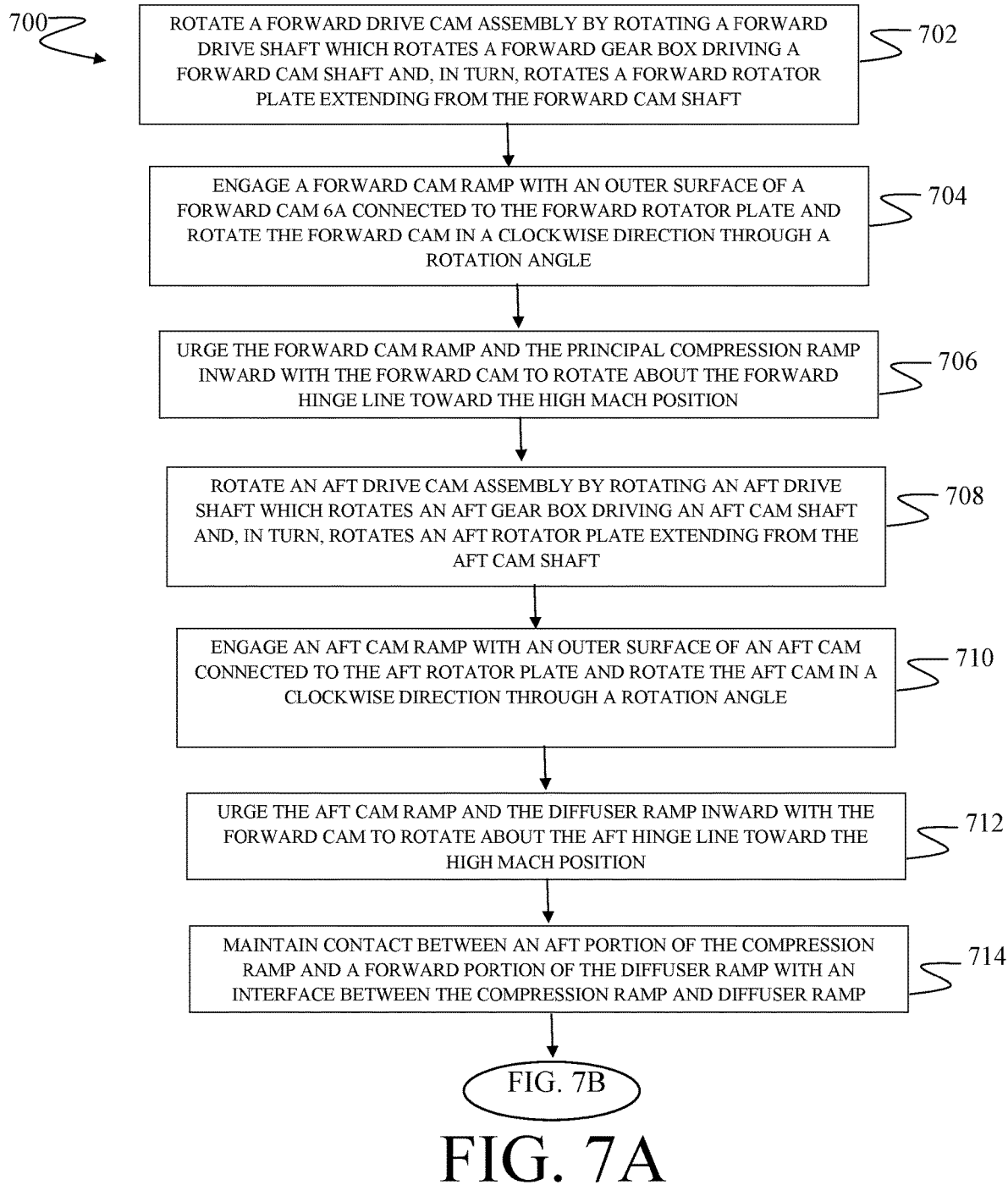

A method 700 of increasing inlet efficiency for a dual ramp caret inlet with a principal compression ramp and a diffuser ramp across a range of Mach numbers provided by the implementations disclosed is shown in FIGS. 7A and 7B. To transition from a low Mach position to a high Mach position, a forward drive cam assembly is rotated by rotating a forward drive shaft which rotates a forward gear box 62a driving a forward cam shaft 64a and, in turn, rotates a forward rotator plate 66a extending from the forward cam shaft 64a, step 702. A forward cam ramp 74a, extending from the principal compression ramp 22, is engaged with an outer surface 70a of a forward cam 68a connected to the forward rotator plate and rotation of the forward rotator plate rotates the forward cam in a clockwise direction through a rotation angle, step 704. The forward cam urges the forward cam ramp 74a and the principal compression ramp 22 inward to rotate about the forward hinge line 36 toward the high Mach position, step 706. Simultaneously, an aft drive cam assembly is oppositely rotated by rotating an aft drive shaft which rotates an aft gear box 62b driving an aft cam shaft 64b and, in turn, rotates an aft rotator plate 66b extending from the aft cam shaft 64a, step 708. An aft cam ramp 74a, extending from the diffuser ramp 24, is engaged with an outer surface 70a of an aft cam 68b connected to the aft rotator plate and rotation of the aft rotator plate rotates the aft cam in a counterclockwise direction through the rotation angle, step 710 The aft cam urges the aft cam ramp 74b and the diffuser ramp 24 inward to rotate about the aft hinge line 38 toward the high Mach position, step 712. Contact is maintained between an aft portion of the compression ramp and a forward portion of the diffuser ramp with an interface 26 between the compression ramp 22 and diffuser ramp, step 714.

To transition from the high Mach position to the low Mach position, the forward cam drive assembly 52 is counter rotated and an inner surface 72a of the forward cam 68a is engaged with a forward roller assembly 76a mounted to the forward cam ramp 74a proximate an aft edge 78a while the forward rotator plate rotates the forward cam in a counterclockwise direction to withdraw the forward roller assembly expanding the principal compression ramp outward to rotate in a second direction about the forward hinge line toward a low Mach position, step 716. Similarly, the aft drive cam assembly 54 is counter rotated and an inner surface 72a of the aft cam 68b is engaged with an aft roller assembly 76b mounted to the aft cam ramp 74b proximate a forward edge 78b while the aft rotator plate is rotated to rotate the aft cam in a clockwise direction to withdraw the aft roller assembly expanding the diffuser ramp outward to rotate in a second direction about the second hinge line toward a low Mach position, step 718. Contact is maintained between the aft portion of the compression ramp and the forward portion of the diffuser ramp with the interface, step 720.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims. Within the specification and the claims the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard", "upper" and "lower", "forward" and "aft" or "rearward", "leading" and "trailing", and "right" and "left" are employed to describe relative positioning and other than for the specific implementations disclosed may be substituted with appropriate descriptors such as "first" and "second", "top" and "bottom" or "right" and "left", and "clockwise" and "counterclockwise" may be reversed depending on orientation of actual implementation.

What is claimed is:

1. An engine inlet for efficient operation at off-design Mach number comprising:
   an initial compression ramp;
   a principal compression ramp extending aft from and rotatably attached to the initial compression ramp at a forward hinge line, said principal compression ramp rotatable from a low Mach position to a high Mach position;
   a diffuser ramp engaged by the principal compression ramp at an interface, said diffuser ramp rotatably mounted at an aft hinge line to a diffuser, said diffuser ramp rotatable oppositely to the principal compression ramp to maintain contact at the interface; and
   an actuation mechanism having
      a forward cam drive assembly configured to rotate the principal compression ramp about the forward hinge line;
      an aft cam drive assembly configured to rotate the diffuser ramp about the aft hinge line; and
      a motor assembly having at least one motor to drive the forward cam drive assembly and the aft cam drive assembly.

2. The engine inlet of claim 1 wherein the motor assembly comprises:
a motor with a gear box configured to drive a forward drive shaft and an aft drive shaft with opposite rotational directions, said forward drive shaft engaged to rotate the forward cam drive assembly and said aft drive shaft engaged to rotate the aft cam drive assembly.

3. The engine inlet of claim 2 wherein the forward cam drive assembly comprises:
a forward gear box driving a forward cam shaft;
a forward rotator plate extending from the forward cam shaft;
an arcuate forward cam having an outer surface and an inner surface;
a forward cam ramp, extending from the principal compression ramp and receiving the outer surface of the forward cam whereby rotation of the forward cam in a clockwise direction through a rotation angle urges the forward cam ramp and principal compression ramp inward to rotate about the forward hinge line toward the high Mach position.

4. The engine inlet of claim 3 wherein the outer surface of the forward cam and forward cam ramp are in sliding engagement.

5. The engine inlet of claim 3 wherein the forward cam ramp incorporates an array of bearings and the outer surface of the forward cam and forward cam ramp are in rolling engagement.

6. The engine inlet of claim 3 wherein the forward rotator plate engages the forward cam with a first radius relative to a rotation axis of the forward cam shaft corresponding to the low Mach position of the principal compression ramp 2 and a second radius at the rotation angle corresponding to the high Mach position.

7. The engine inlet of claim 3 wherein the forward cam drive assembly further comprises a forward roller assembly mounted to the forward cam ramp proximate an aft edge and engaging the inner surface of the forward cam.

8. The engine inlet of claim 7 wherein the forward roller assembly comprises cantilever rolling pins and on opposing sides of the forward rotation plate engaging the inner surface of the forward cam in rolling contact.

9. The engine inlet of claim 7 wherein the forward roller assembly comprises stub axles rotationally supporting wheels or roller bearings engaging the inner surface of the forward cam for low friction engagement.

10. The engine inlet of claim 3 wherein the aft cam drive assembly comprises:
an aft gear box driving an aft cam shaft;
an aft rotator plate extending from aft forward cam shaft;
an arcuate aft cam having an outer surface and an inner surface;
an aft cam ramp, extending from the diffuser ramp and receiving the outer surface of the aft cam whereby rotation of the aft cam in a counterclockwise direction through the rotation angle urges the aft cam ramp and diffuser ramp inward to rotate about the aft hinge line toward the high Mach position.

11. The engine inlet of claim 10 wherein the outer surface of the aft cam and aft cam ramp are in sliding engagement.

12. The engine inlet of claim 10 wherein the aft cam ramp incorporates an array of bearings and the outer surface of the aft cam and aft cam ramp are in rolling engagement.

13. The engine inlet of claim 10 wherein the forward rotator plate engages the forward cam with a first radius relative to a rotation axis of the forward cam shaft corresponding to the low Mach position of the principal compression ramp and a second radius at the rotation angle corresponding to the high Mach position.

14. The engine inlet of claim 10 wherein the aft cam drive assembly further comprises an aft roller assembly mounted to the aft cam ramp proximate an forward edge and engaging the inner surface of the aft cam.

15. The engine inlet of claim 14 wherein the aft roller assembly comprises cantilever rolling pins and on opposing sides of the aft rotation plate engaging the inner surface of the aft cam in rolling contact.

16. The engine inlet of claim 14 wherein the aft roller assembly comprises stub axles rotationally supporting wheels or roller bearings engaging the inner surface of the aft cam for low friction engagement.

17. A method for operation of a variable geometry caret inlet, said method comprising:
rotating a forward drive cam assembly urging a compression ramp inward to rotate in a first direction about a forward hinge line toward a high Mach position;
oppositely rotating an aft drive cam assembly urging a diffuser ramp inward to rotate in a first direction about an aft hinge line; and,
maintaining contact between an aft portion of the compression ramp and a forward portion of the diffuser ramp with an interface between the compression ramp and diffuser ramp.

18. The method as defined in claim 17 further comprising:
counter-rotating the forward drive cam assembly to expand the compression ramp outward to rotate in a second direction about the forward hinge line toward a low Mach position;
counter-rotating the aft drive cam assembly to expand the diffuser ramp outward to rotate in a second direction about the aft hinge line; and
maintaining contact between the aft portion of the compression ramp and the forward portion of the diffuser ramp with the interface.

19. The method as defined in claim 18 wherein the step of rotating a forward drive cam assembly comprises;
rotating a forward drive shaft;
rotating a forward gear box driving a forward cam shaft;
rotating a forward rotator plate extending from the forward cam shaft;
engaging a forward cam ramp, extending from the compression ramp, with an outer surface of a forward cam connected to the forward rotator plate and rotating the forward cam in a clockwise direction through a rotation angle; and
urging the forward cam ramp and compression ramp inward with the forward cam to rotate about the forward hinge line toward the high Mach position;
and the step of rotating an aft drive cam assembly comprises:
rotating an aft drive shaft;
rotating an aft gear box driving an aft cam shaft;
rotating an aft rotator plate extending from an aft cam shaft;
engaging an aft cam ramp, extending from the diffuser ramp, with an outer surface of an aft cam connected to the aft rotator plate and rotating the aft cam in a counterclockwise direction through the rotation angle; and
urging the aft cam ramp and diffuser ramp inward with the aft cam to rotate about the aft hinge line toward the high Mach position.

20. The method as defined in claim 19 wherein the step of counter-rotating the forward drive cam assembly comprises:

engaging an inner surface of the forward cam with a forward roller assembly mounted to the forward cam ramp proximate an aft edge; and rotating the forward rotator plate to rotate the forward cam in a counterclockwise direction to withdraw the forward roller assembly expanding the compression ramp outward to rotate in a second direction about the forward hinge line toward a low Mach position;

and wherein the step of counter-rotating the aft drive cam assembly comprises:

engaging an inner surface of the aft cam with an aft roller assembly mounted to the aft cam ramp proximate a forward edge; and rotating the aft rotator plate to rotate the aft cam in a clockwise direction to withdraw the aft roller assembly expanding the diffuser ramp outward to rotate in a second direction about the aft hinge line toward a low Mach position.

\* \* \* \* \*